Figure 10:
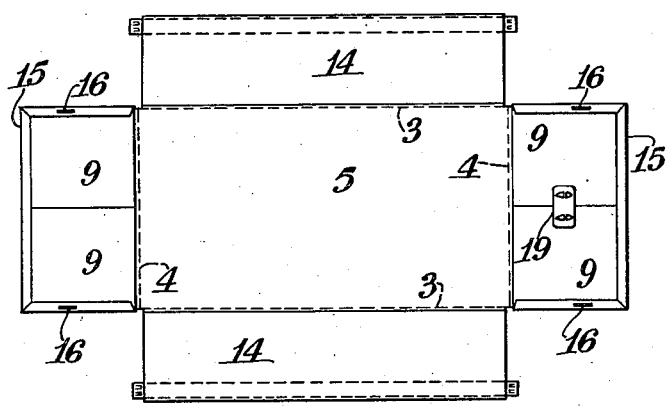

Sept. 13, 1938. E. S. ROSCOE 2,129,965
DRAWER AND THE LIKE
Filed June 5, 1936 2 Sheets-Sheet 1
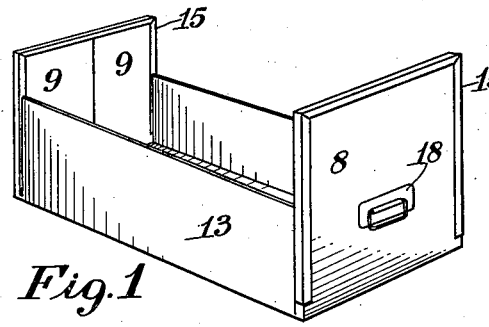
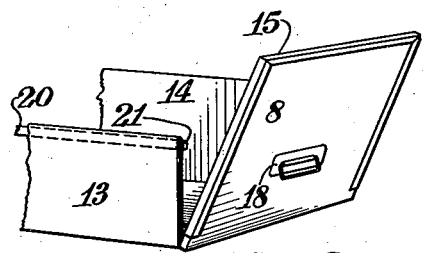
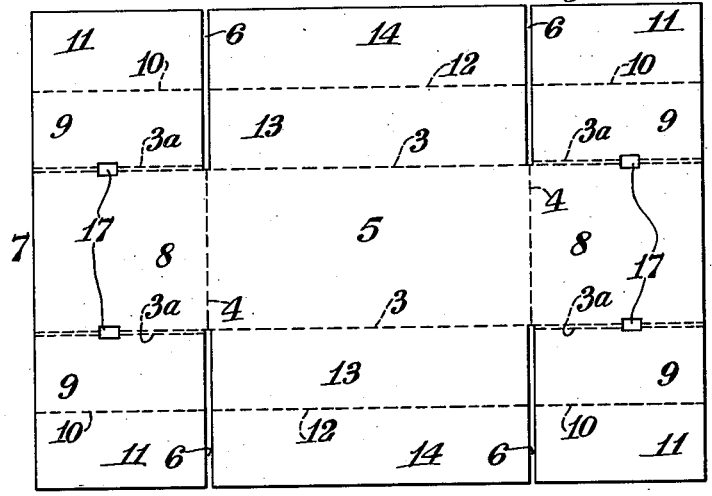
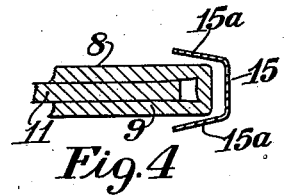
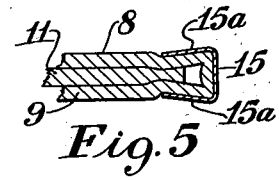
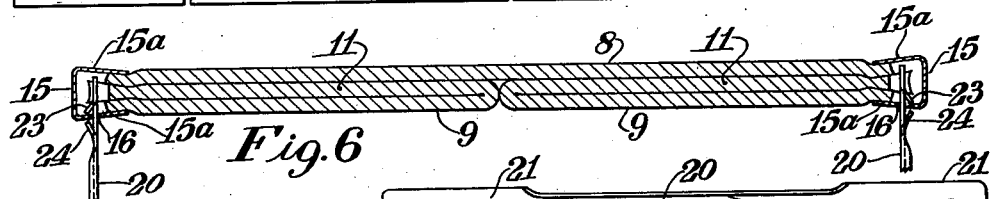
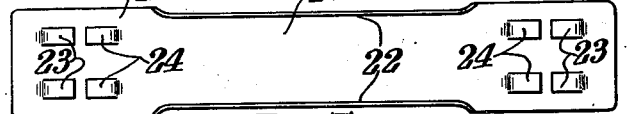
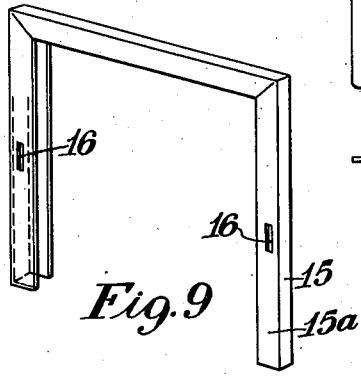
INVENTOR
EDWIN S. ROSCOE
BY D. Clyde Jones
ATTORNEY Sept. 13, 1938. E. S. ROSCOE 2,129,965
DRAWER AND THE LIKE
Filed June 5, 1936 2 Sheets-Sheet 2

INVENTOR
EDWIN S. ROSCOE
BY D. Clyde Jones
ATTORNEY

Patented Sept. 13, 1938

2,129,965

UNITED STATES PATENT OFFICE 2,129,965

DRAWER AND THE LIKE

Edwin S. Roscoe, Rochester, N. Y., assignor to Yawman & Erbe Mfg. Co., Rochester, N. Y., a corporation of New York Application June 5, 1936, Serial No. 83,707

3 Claims. (Cl. 229—30)

This invention relates to improvements in reinforced fiber board drawers for transfer files, cabinets and the like, and particularly to a drawer or container of this kind which can be stored and transported in a knockdown condition and yet is easily assembled for use.

The principal object of the invention is to provide an inexpensive drawer of this kind which may be stored and delivered to the customer in knockdown condition, which is strong and light, and which can be readily set up by an unskilled person without the use of tools.

Another object of the invention is the provision of a drawer of this kind having reinforced sides and ends provided with interlocking means whereby these sides and ends can be quickly and firmly secured together when the drawer is being set up.

A still further object of the invention is the provision of reinforcing members for the sides and ends of a drawer, said reinforcing members being provided with interlocking means whereby the ends and sides are secured together to form a drawer with a rigid frame.

Another object of the invention is the provision of a drawer having a body formed of a single piece of material in which the ends are formed of a plurality of thicknesses of the material and are reinforced at their free edges.

A further object of the invention is the provision of a drawer formed of fiber board material and provided with means for locking the ends and sides together, said locking means being releasable by the use of a suitable implement.

To these and other ends the invention resides in certain novel construction and arrangement of parts, hereinafter fully described and illustrated in the accompanying drawings forming a part of this specification, the novel features being particularly pointed out in the claims at the end of this specification.

Figure 11:
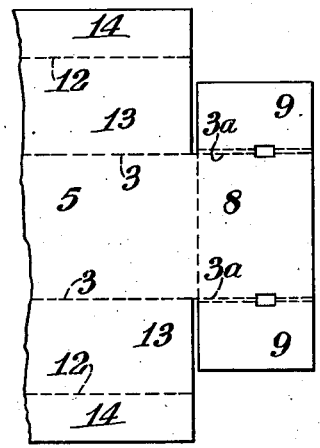
Figure 12:
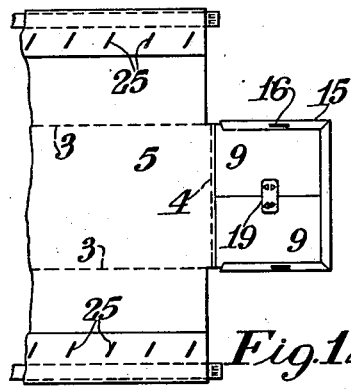
Figure 13:
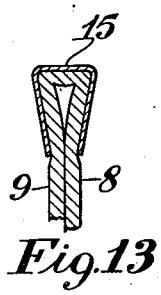
Figure 14:
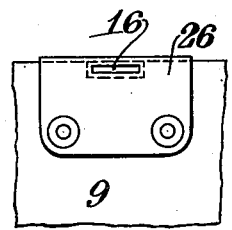
Figure 15:
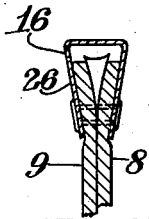
Figure 16:
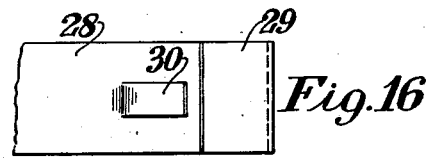
Figure 18:
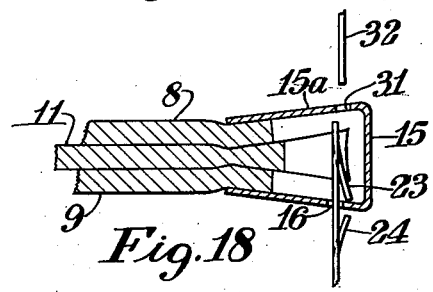
Figure 17:
Figure 21:
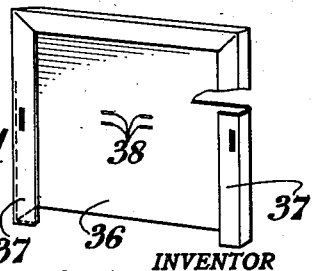
Figure 19:
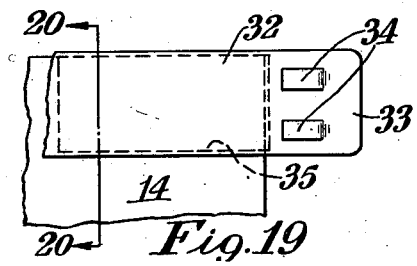
Figure 20:
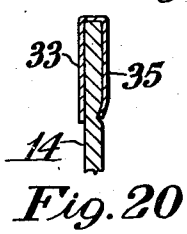

In the drawings:

Fig. 1 is a perspective view of an assembled drawer illustrating one possible embodiment of the invention; Fig. 2 is a similar fragmentary view of the drawer showing an end thereof in position for locking to the drawer sides; Fig. 3 is a plane view of a blank from which the body of the drawer may be formed; Fig. 4 is a fragmentary sectional view through a drawer end illustrating a step in the application of a reinforcing member to the free margins thereof; Fig. 5 is a similar view showing the reinforcing member secured to the margin of the drawer end; Fig. 6 is a horizontal section through a reinforced drawer end, showing fragmentary portions of the side locking members associated therewith; Fig. 7 is a side view of a side reinforcing member; Fig. 8 is an edge view of this reinforcing member; Fig. 9 is a perspective view of an end reinforcing member before it is secured to the margin of a drawer; Fig. 10 is a plan view of the complete reinforced drawer in the knockdown or flat condition; Fig. 11 is a modified drawer blank illustrating another possible embodiment of the invention, a part thereof being broken away to conserve space; Fig. 12 shows in the knockdown or flat condition, a fragment of a drawer made from the blank disclosed in Fig. 11; Fig. 13 is a fragmentary sectional view illustrating a reinforcing member applied to the end of the drawer shown in Fig. 12; Figs. 14 and 15 are fragmentary detail views showing another possible construction of the end locking member; Figs. 16 and 17 are fragmentary detail views illustrating another possible construction of a side reinforcing member; Fig. 18 is an enlarged sectional view of cooperating side and end interlocking members, showing how they may be released by a suitable tool; Figs. 19 and 20 are fragmentary views illustrating another possible construction of a side reinforcing member, and Fig. 21 shows a modified reinforcement for a drawer end.

Referring to the drawings, and particularly to a preferred embodiment of the invention illustrated in Figs. 1 to 10 inclusive, the reference number 1 designates a drawer suitable for use in a transfer file cabinet. The drawer is made from a blank of pasteboard or like material of rectangular shape as shown in Fig. 3, so that there is substantially no waste material. This blank is provided with spaced longitudinal score lines 3, 3 and with transverse score lines 4, 4 in spaced parallel relation to define a bottom section 5. The blank is also provided with slits or cuts 6 extending in alinement from the ends of each score line 4 through the adjacent long edges of the sheet. The score lines 4, 4 and the cuts or slits 6 define end sections 7, 7 at each end of the blank from which the drawer ends are formed. The prolongations 3a of the score lines 3, 3 together with the adjacent score line 4, define a main panel 8 of each end section. This panel has connected thereto at each side edge thereof lateral extensions 9, 9 each of which is scored medially thereof at line 10 to provide an end flap 11. The slits 6 and the score lines 3 define side sections each of which is foldable along a longitudinal medial score line 12 to provide a drawer side 13, and a side extension 14 connected thereto.

In assembling the drawer into its knockdown form, each end of the drawer is formed by folding the end flaps 11 of each end section on the score lines 10 to contact with their related lateral extensions 9, the contacting surfaces of these parts being adhesively joined together. Each lateral extension 9 with an end flap 11 adhesively fastened to one surface thereof, is then folded on a score line 3a to bring the exposed surface of the flap 11 into engagement with the main panel 8 where their contacting surfaces are adhesively joined together. It will be understood, especially from Fig. 6, that each lateral extension 9 and its folded-over end flap 11 covers one-half of the panel, thus providing a drawer end of three ply thickness. Each drawer end when thus assembled has its free margins reinforced as illustrated in Figs. 1, 2 and 10 by a metal frame 15 which is channel-shaped in cross section. This frame before it is applied, has its flanges 15a bent outwardly (Fig. 4) so that the free margins of the drawer end can be inserted readily into the frame. Thereafter the edges of the flanges 15a are pressed or crimped against the marginal surfaces of the drawer end with sufficient force to compress the fiber board layers or plies of which it is composed. It should be noted that the inner flange 15a of each upright of the frame is provided with a slot 16 to receive a locking element to be described. The material of the blank is cut away as indicated at 17, 17 (Fig. 3) to provide a space behind each slot 16. A conventional drawer pull 18 is secured to the front end of the drawer by means of spaced pairs of tongues projecting from the drawer pull return and passing through openings in the drawer end as well as through openings in the counter plate 19 to engage the inside of the drawer end Fig. 10.

Each side of the drawer is formed by folding the side extension 14 on the score line 12 until a surface of this extension contacts a surface of the drawer side 13. In order to reinforce each side of the drawer a strip of metal 20 is inserted between the drawer side 13 and the side extension 14 preferably at the top thereof adjacent the score line 12. After the strip has been thus inserted, the contacting surfaces of the drawer side 13 and the side extension 14 are adhesively joined together.

The strip 20 is longer than the drawer sides so that end extensions 21 at each end thereof project beyond the drawer sides. Since the strip 20 is preferably made of light stock, the intermediate portion thereof which is enclosed within the drawer side is provided with reinforcing ribs 22 in each long margin thereof. The end extensions 21 of the strip have pairs of struck out lugs 23 at each end portion. The free ends of these lugs project toward the intermediate portion of the strip and serve to lock the reinforcing strip 22 to the channel frame 15, when the end extension 21 has been inserted into the slot 16 in the channel upright. It will be understood that each pair of ears 23 engage the inside surface of the inner channel flange 15a to lock the mentioned parts together. There is also provided on each end portion of the strip a pair of struck out stops 24, the free ends of which project toward the free ends of the locking lugs 23 in slightly spaced relation thereto. These stops limit the extent of movement of the end portion 21 into the channel of the frame 15.

In Fig. 11 there is illustrated a modified type of blank suitable for making a knock-down drawer of a modified type illustrated in Fig. 12. The parts of this blank and the assembled drawer which are identical with the parts previously described are identified by the same reference characters. This blank differs from that already described in that the end flaps 11 have been omitted on the lateral extensions of the end sections. Also the width of the side sections 14 of the drawer sections have been reduced so that the side extension is narrower than the drawer side.

In assembling the end sections of this drawer, the lateral extensions 9 thereof are folded on the score line 3a until they contact the drawer panel 8 where the contacting surfaces are joined together by suitable adhesive. The channel frame 15 is then applied to each free margin of the composite drawer end in the manner previously described. The drawer sides are assembled by folding the side extension 14 on the score line 12 and inserting a reinforcing strip 20, similar to that described, between these parts at the mentioned fold. Since the side extension 14 is relatively narrow, it is difficult to make a satisfactory seal by using adhesive and therefore the side extension is secured to the drawer side by suitable staples 25. The drawer pull is attached to the front end of the drawer as before.

In erecting the drawers illustrated in Figs. 10 and 12, the drawer sides are folded on the score lines 3 until these sides extend at right angles to the bottom section 5. Both drawer ends are then folded on the score lines 4 as illustrated in Fig. 2 until the ends 21 of the reinforcing strips can be inserted in their related slots 16 in the channel frames, these ends being inserted therein until limited by the stops 24 at which time the free ends of the resilient ears 23 will engage the inner surface of the channel flanges 15a.

Instead of providing a channel frame 15 which engages all free margins of the composite drawer end, a U-shaped clip 26, as illustrated in Figs. 14 and 15, may embrace each of the side margins of the end portion. Each clip has a slot 16 therein and the clip is so positioned on a margin of the drawer end that the slot 16 will receive the end extensions of a side-reinforcing strip 20 when the drawer is set up.

A modified reinforcing strip 28 which may be substituted for the reinforcing strip 20 already described, is illustrated in Figs. 16 and 17. In this modified arrangement the end extension of the strip 28 has an end portion folded back upon itself to provide a latch 29 which functions in the same manner as the pair of latches 23 in the reinforcing strip previously described. A single lug 30 struck up from the material at the end extension projects toward the free end of the latch 29 and limits the insertion of the reinforcing strip into the channel of the frame 15.

In the arrangements previously described, it is not possible to restore the erected drawer to its knock-down condition. However, by the construction shown in Fig. 18, it is possible to obtain this result. In the flange 15a opposite the slot 16 in the frame 15, there is provided an opening 31 through which a flat tool 32 can be inserted so that the latches such as 23 and 29 can be forced toward the plane of the end extension of a reinforcing strip whereby this strip can be withdrawn from engagement with the channel frame 15 thru the slot 16.

In Figs. 19 and 20 there is illustrated a further type of reinforcing strip for the side of the drawer. The reinforcing strips previously described have been enclosed between the contacting surface of the drawer side 13 and the side extension 14. In the present instance the side reinforcing strip 32 is U-shaped except for its end extensions 33 which are flat. This U-shaped reinforcing strip is adapted to straddle the long free edge of the drawer side, the long free edges of the strip being compressed into the fibrous material of the drawer side. Each end extension of the strip is provided with a pair of struck up ears 34, the free ends of which project toward the drawer side. It will be understood that this last-mentioned reinforcing strip can replace the reinforcing strips used in the drawers illustrated in Figs. 10 and 12.

There is illustrated in Fig. 21, a modified drawer end-reinforcing construction which comprises a metal face or veneer 36 for a drawer end and a frame integral therewith similar to that frame disclosed in Fig. 9. In this modified arrangement a piece of sheet metal has its side and top margins folded on itself to provide flanges 37 extending parallel to the plane of the sheet and spaced therefrom a distance approximately equal to the thickness of drawer end margins to be engaged thereby. In applying this reinforcement to a drawer end, the metal face 36 is superimposed on the outside surface of the drawer end in which position it is held by crimping the flanges into the fibrous material of the drawer end. Suitable spaced pairs of slits 38 in the metal face 36 are adapted to receive drawer pull-retaining means. By this construction the drawer end is not only reinforced but its exposed surface is veneered with metal so that the drawer has a more finished appearance.

Although several possible embodiments of the invention are shown and described herein it will be understood that the other changes are possible and that this application is intended to cover such changes or modifications as come within the spirit of the invention or scope of the following claims.

What I claim is:

1. A drawer comprising a body made from fibrous sheet material and having ends and sides formed by slitting and folding the material on itself, flat metal strips extending throughout the length of said sides and secured in the folds adjacent the upper edges of said sides to project beyond the ends thereof, rigid reinforcing members channel-shaped in cross section gripping the free margins of each of the ends, and means on the projecting ends of said strips for engagement with cooperating means on said members for attaching the ends to the sides.

2. A drawer comprising a body made from a piece of fibrous sheet material having sides and ends formed by slitting and folding the material on itself, and reinforcing means for the free margins of said sides and ends, said reinforcing means comprising a metal frame fastened on each end and a flat metal strip for each side, each frame being channel-shaped in cross section and having slots in the side portions thereof opening through the inner face of the frame, each metal strip extending throughout a drawer side in the fold adjacent the upper margin thereof and having projecting resilient latches for engaging the slots in the frames on said ends.

3. A knock-down drawer including sides and ends, locking means for securing the ends to the sides, said means comprising a channel member on each end having an opening therein, and a cooperating member forming a part of each side and projecting beyond the ends thereof, said cooperating member having a resilient projection thereon adapted to be depressed when inserted into said opening in the channel member and to spring into engagement therewith when it has passed through the opening, said channel member having a second opening adapted to receive a suitable tool for releasing said resilient projection from engagement with the channel member.

EDWIN S. ROSCOE.